UNITED STATES PATENT OFFICE.

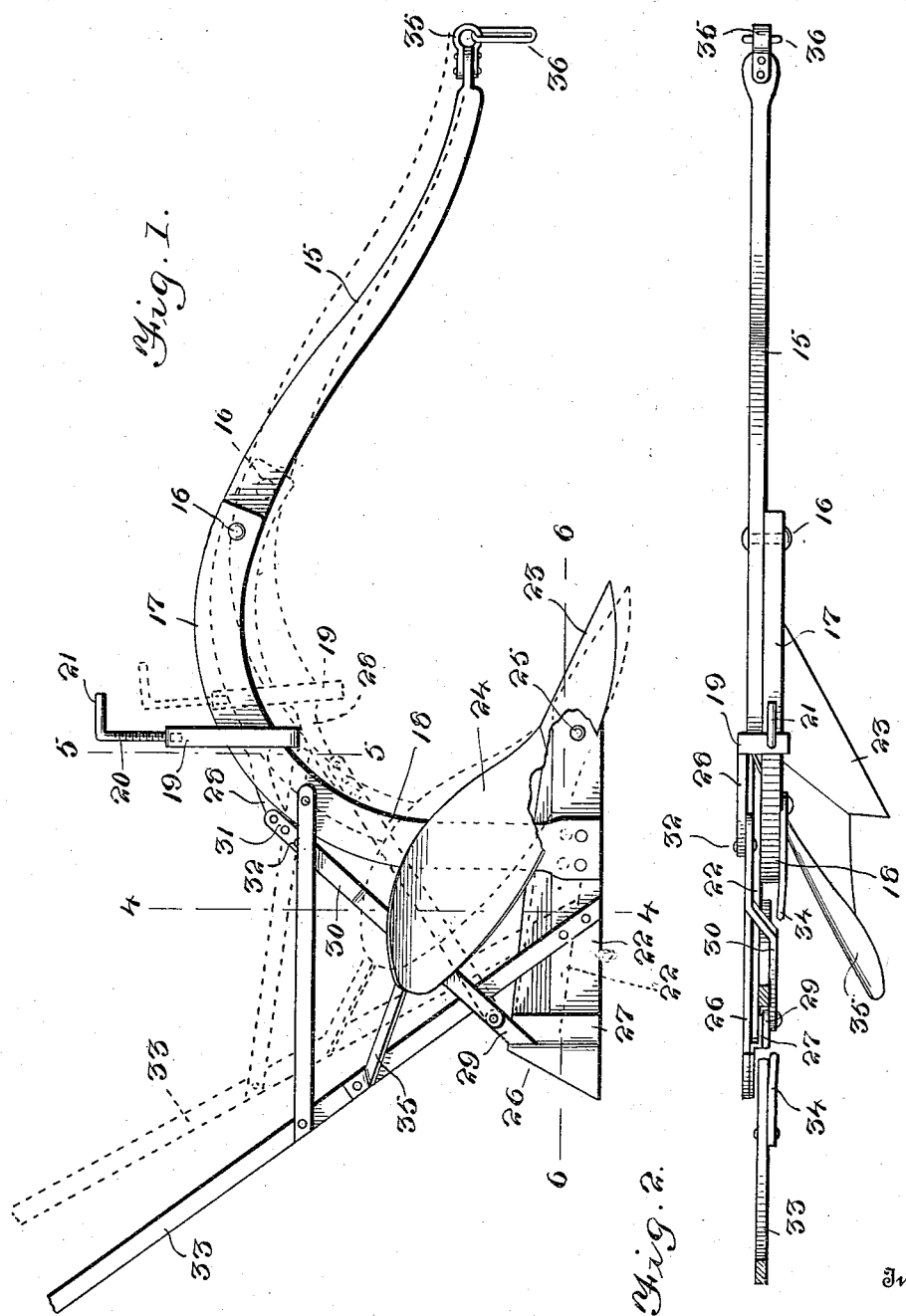

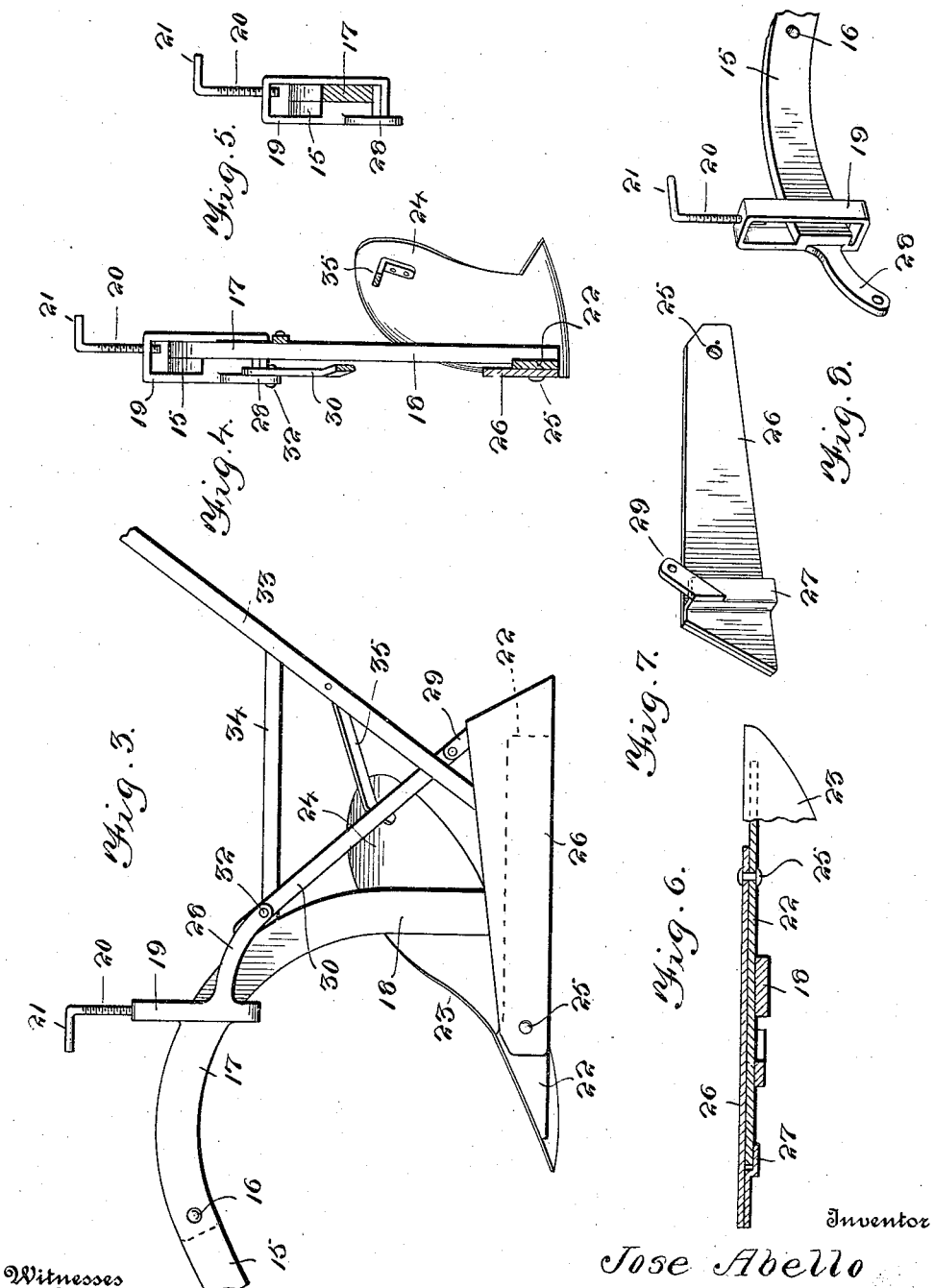

JOSÉ ABELLO, OF ISABELA, PHILIPPINE ISLANDS.

PLOW.

1,161,825.   Specification of Letters Patent.   Patented Nov. 30, 1915.

Application filed February 20, 1915. Serial No. 9,690.

*To all whom it may concern:*

Be it known that I, José Abello, a citizen of the Philippine Islands, residing at Isabela, Negros Occidental, Philippine Islands, have invented new and useful Improvements in Plows, of which the following is a specification.

This invention is designed primarily to provide a plow or like implement which will operate successfully in all conditions of soil and with a minimum draft, such plow operating with facility in ground containing roots or which has become baked by drought.

A further object of the invention is to produce a plow having an auxiliary land side member pivotally connected therewith, said auxiliary member constituting a protection and reinforcement for the land side proper, and said auxiliary member constituting also the guide or gage whereby the plow is maintained in a level condition while plowing at various depths.

A further object of the invention is to produce a plow of the class described having simple and efficient adjusting means for determining the depth of plowing.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a view in side elevation of a plow constructed in accordance with the invention, portions of the share and mold board having been broken away and with dotted lines showing the parts arranged for deep plowing. Fig. 2 is a top plan view. Fig. 3 is a side view of the plow as seen from the land side. Fig. 4 is a vertical transverse sectional view taken on the line 4—4 in Fig. 1. Fig. 5 is a transverse sectional detail view taken on the line 5—5 in Fig. 1. Fig. 6 is a horizontal sectional view taken on the line 6—6 in Fig. 1. Fig. 7 is a perspective view of the auxiliary land side member detached. Fig. 8 is a perspective view showing the rear portion of the main plow beam detached.

Corresponding parts in the several figures are denoted by like characters of reference.

The main plow beam 15 is pivotally connected at 16 with an arcuate beam 17 which is formed integral with the standard 18 from which it extends in an upward and forward direction.

Rigidly connected with the beam 15 at the rear end of the latter is an elongated sleeve or collar 19 through which the beam 17 extends, said collar being of such dimensions as to permit the parts 15 and 17 to have a free relative swinging movement about the axis of the pivot member 16, such swinging movement being, however, limited by a set screw 20 threaded through the upper portion of the collar 19 through which the arm 17 extends, said collar being of such dimensions as to permit the parts 15 and 17 to have a free relative swinging movement about the axis of the pivot member 16, such swinging movement being, however, limited by a set screw 20 threaded through the upper portion of the collar 19 and having a handle 21 whereby it may be conveniently turned or adjusted. This set screw is positioned so as to lie in the path of the arm 17, thereby limiting the relative swinging movement of the parts.

The standard 18 carries the land side 22, as well as the share 23 and the mold board 24, all of which are of well known or any suitable construction, the point of the share being extended below the lower edge of the land side so as to dig readily into the soil.

Movably connected with the land side 22 near the forward end thereof and beneath the share by means of a pivot member 25 is an auxiliary land side member 26 which extends rearwardly with its inner face in contact with the outer face of the land side proper. The superficial area of the auxiliary land-side member materially exceeds that of the land side proper, and it is provided on its inner face near its rear end with a flange 27, whereby the rearward end of the land side proper is guided when the land side proper swings about the axis of the pivot member 25. The rearward end of the auxiliary land side member is of a height materially exceeding that of the land side proper, so that at various adjustments of the parts the outer face of the land side proper will lie in contact with the inner face of the auxiliary land side member. The latter, however, is tapered in a forward direction so that its forward edge will lie beneath the edge of the share 23.

The rearward end of the beam 15 is provided with a rearwardly extending lug 28, and a similar lug 29 is connected with the rearward end of the auxiliary land side member from which it projects in an upward direction, said lugs being connected together by means of a connecting rod 30 with which the said lugs are pivotally connected.

The rod 30 is provided near its upper end with a plurality of apertures 31 for the passage of the pivot member 32, thereby enabling the beam to be tilted to various adjustments. A single handle 33 is connected at its lower end with the land side 22, said handle being connected with the standard 18 by means of a brace rod 34 and with the mold board by means of a brace rod 35. The forward end of the beam 15 is equipped with the customary draft clevis 36 and link 37.

In the operation of the improved plow, it is the auxiliary land side member 26 which constitutes the gage whereby the plow is guided. For shallow plowing the lower edge of the land side proper is maintained in substantially parallel relation to the lower edge of the auxiliary land side member, as seen in full lines in Fig. 1, and the parts are maintained in this relative position by threading the set screw 20 downwardly through the collar until the arm 17 of the land side is confined immovably between the lower end of the collar and the lower end of the point or set screw. Should it be desired to plow deeper it is only necessary to operate the set screw so as to gradually retract the latter in an upward direction. Draft exerted at the forward end of the beam 15 will have a tendency to swing the beam about the axis of the pivot 16, thereby lowering the rearward end of the beam and at the same time exerting a forward draft on the pivot member 16 whereby the arm 17, standard 18 and related parts will be gradually tilted about the axis of the pivot 25, thereby tilting the point of the share downwardly and elevating the rear end of the land side 22 without affecting the level condition of the auxiliary land side member. The tilting movement will be limited by engagement of the set screw 20 with the arm 17, and by proper adjustment of said set screw it is evident that the plow may be made to run deep or shallow, as may be desired. Thus, when the earth is baked extremely hard or when the progress of the plow is materially obstructed by roots and the like, the depth of the furrow may be reduced, while when the conditions favor the making of a deep furrow the necessary adjustments to that end may easily and quickly be made.

Having thus described the invention, what is claimed as new, is:—

1. In a plow, a beam, a standard having a forwardly extending arm pivotally connected with the beam intermediate the ends of the latter, a collar secured on the beam surrounding the arm and having a set screw threaded therethrough and lying in the path of the arm to limit the relative pivotal movement of the parts, and a land side, a share and a mold board carried by the standard; in combination with an auxiliary land side member pivotally connected at its forward end with the land side proper and having on its inner face a flange whereby the rear end of the land side proper is guided.

2. In a plow, a beam, a standard having a forwardly extending arm pivotally connected with the beam intermediate the ends of the latter, a collar secured on the beam surrounding the arm and having a set screw threaded therethrough and lying in the path of the arm to limit the relative pivotal movement of the parts, and a land side, a share and a mold board carried by the standard; in combination with an auxiliary land side member pivotally connected at its forward end with the land side proper and having on its inner face a flange whereby the rear end of the land side proper is guided, and a link member connecting the rearward end of the beam with the rearward end of the auxiliary land side member.

3. In a plow, a beam, a standard having a forwardly extending arm pivotally connected with the beam intermediate the ends of the latter, a collar secured on the beam surrounding the arm and having a set screw threaded therethrough and lying in the path of the arm to limit the relative pivotal movement of the parts, and a land side, a share and a mold board carried by the standard; in combination with an auxiliary land side member pivotally connected at its forward end with the land side proper and having on its inner face a flange whereby the rear end of the land side proper is guided, a link member connecting the rearward end of the beam with the rearward end of the auxiliary land side member, and means whereby said link is adjustably connected with respect to the rearward end of the beam.

4. A plow including a standard, a land side connected therewith, and a share and mold board supported on the land side, said standard having a forwardly extending arm, a beam pivotally connected intermediate its ends with the forward end of the arm and having at its rearward end a collar surrounding the arm and a set screw threaded through the collar and lying in the path of the arm, an auxiliary land side member pivotally connected with the land side proper near the forward end thereof, and having means for guiding the land side proper in its pivotal movement about the axis of the pivot member, a link connection between the rearward end of the beam and the rearward end of the auxiliary land side member, a handle secured upon the land side proper, and brace members connecting said handle with the standard and with the mold board.

In testimony whereof I affix my signature in presence of two witnesses.

JOSÉ ABELLO.

Witnesses:
VIDA GALLAND,
TUANIS VILLANNEVER.

Copies of this patent may be obtained for five cents each, by addressing the "Commissioner of Patents, Washington, D. C."